US006877156B2

(12) United States Patent
Osborne et al.

(10) Patent No.: US 6,877,156 B2
(45) Date of Patent: Apr. 5, 2005

(54) RECOGNITION OF COMMAND RELATED ITEMS IN OBJECT CODE

(75) Inventors: Andrew James Osborne, Eastleigh (GB); Colin Ronald Penfold, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 09/934,350

(22) Filed: Aug. 21, 2001

(65) Prior Publication Data

US 2002/0046398 A1 Apr. 18, 2002

(30) Foreign Application Priority Data

Aug. 26, 2000 (GB) .............................................. 0021006

(51) Int. Cl.$^7$ .............................................. G06F 9/45
(52) U.S. Cl. ........................ 717/143; 717/146; 717/154
(58) Field of Search ................................ 717/126–154

(56) References Cited

U.S. PATENT DOCUMENTS

| 5,361,351 | A | * | 11/1994 | Lenkov et al. .............. 717/124 |
| 5,432,795 | A | | 7/1995 | Robinson ................... 371/19 |
| 5,671,416 | A | * | 9/1997 | Elson ......................... 717/106 |
| 5,812,850 | A | | 9/1998 | Wimble ...................... 395/704 |
| 5,946,484 | A | * | 8/1999 | Brandes ...................... 717/136 |
| 6,071,317 | A | | 6/2000 | Nagel ............................. 717/4 |
| 6,091,896 | A | | 7/2000 | Curreri et al. .............. 395/704 |
| 6,286,035 | B1 | * | 9/2001 | Gillis et al. ................. 709/206 |

OTHER PUBLICATIONS

CICS Operations and Utilities Guide, Version 2, Release 1, SC34–5717–02, Dec. 2000.

* cited by examiner

Primary Examiner—Wei Y. Zhen
Assistant Examiner—Chuck Kendall
(74) Attorney, Agent, or Firm—Gregory M. Doudnikoff

(57) ABSTRACT

A system and method of recognising command related items in a body of object code, such as command names and/or associated option names involves entering a list of required command names and/or option names in programming language form into a filter table. The object code is then scanned for all bit strings potentially representing command names and identifying such names. For each potential command name, succeeding bits are then examined for bits which represent valid options for each said command name so as to further confirm the identity of commands having valid combinations of command names and/or options. Optionally, the command/option syntax may also be checked. The candiate commands, including options, now identified in programming language form are then compared with the entries in the filter table to determine whether or not they match the required list, which may be further refined by use of logical operators.

16 Claims, 3 Drawing Sheets

RECOGNITION OF COMMAND RELATED ITEMS IN OBJECT CODE

SUMMARY OF THE INVENTION

1. Field of the Invention

The present invention relates to a method, apparatus and computer program for recognising command related bit strings in object code.

2. Background of the Invention

Incompatibility between application programs and the computing environment in which they run is a general problem faced by program developers. At one extreme, application programs may be incompatible because they are written in a language which is not handled by a particular operating system so that the application program code will not be recognised at all. In a less extreme example, a compiler for the application's programming language on a particular operating system may contain restrictions preventing the use of certain elements of the programming language so that an application program containing such elements will not compile. In yet another case, code may compile but may fail in execution.

Such problems are compounded in heterogeneous distributed computing systems, since computing tasks, in such systems, are, by definition, distributed across several nodes which may be of different types, each potentially having its own local restrictions on processing.

Similar compatibility problems are found in the area of middleware programs. These are programs intermediate the operating system and application program and they are frequently provided in different versions for different operating systems. One well known family of middleware programs is IBM's CICS Transaction Server family ("CICS" is a registered trademark of International Business Machines Corporation). CICS has its own Application Programming Interface, which includes some 200 distinct "EXEC CICS" commands and many more options (parameters) on those commands. It can be the case that application programs for a version of CICS developed for one operating system use commands that are either not valid for other versions or which will cause problems in execution.

Several CICS utility applications are written by Independent Software Vendors and before using these, a customer with a CICS system installed may wish to know whether the ISV application will really run successfully on its particular CICS system. ISV and other application developers, themselves, also have a similar need, when installing various third party CICS utilities, to determine whether the utilities will interoperate successfully with their own developed application programs.

Whereas a developer who has written all the programs on a particular system has the option of examining the program source code of those programs for particular restricted commands or command sequences, possibly after testing and failure analysis, this option is not available where only an object code program is available, as is normally the case for commercially available programs. Additionally, examination of source code is very labour intensive.

One known technique for locating problem components in object code is the use of a load module scanner which scans the object code for the occurrence of predefined bit strings corresponding to commands or options which could cause a problem. Such a scanner is employed in a utility program known as the CICS Transaction Affinities Utility, as described in the "CICS Transaction Affinities Utility Guide", published by IBM (Third Edition, March 1999, SC33-1777-02).

A transaction affinity in CICS is a restrictive condition on which region of a distributed (specifically a multi-region) system a transaction must be run on in order to process the transaction. Because of the requirement to exchange data between certain transactions or with the processing region itself, it is not possible to route all transactions to any available region to process them. Instead, they must be processed by one specific region. As many recent versions of CICS offer a feature known as dynamic transaction routing, which will allocate transactions or component commands to the next available region, it is important to identify whether a given program contains commands subject to affinity restrictions. Such commands are relatively few in number, around 30 in all.

The CICS Transaction Affinities Utility, thus contains a load module scanner program, CAULMS, which is preloaded with double byte strings corresponding to the problem commands. The scanner scans the code in the load module and produces either summary or detailed reports. These identify by name the modules in which the affinity related commands are found, the program language, and the number of possible affinity-causing EXEC CICS commands in the module. The detailed report identifies the EXEC CICS command by name and gives its relative position within the module.

The CAULMS program is tailor made to detect a small number of predefined affinity-causing commands but is not flexible so that it can be used to detect a wide range of sets of commands relating to other types of restrictions. Clearly, it could be modified to substitute the bit strings corresponding to commands and options giving rise to other types of restrictions in each case, but this requires the programmer to have deep knowledge of the object code form of commands and options and to explicitly write them into the source program code, which takes a lot of programming effort.

Besides the CICS Affinities example, U.S. Pat. No. 6,071,317 (R. Nagel, Digits Corp) entitled "Object Code Logic Analysis and Automatic Modification System and Method" describes the location of incorrect format or unresolved date information in program object code and specifically offers a solution to the so-called "Y2K" problem of resolving 20th and 21st century two digit year codes. The object code is disassembled into pseudoassembler code and analysed to locate date references. A code patch to convert the dates to an unambiguous form is provided and stored as a modification to the load module. When the module is executed, the modification is run, rather than the original portion of code. The patent also mentions other potential applications such as the translation of parameter sets to ensure operation in a new environment.

Disassembly of an entire object code program is a burdensome task and may also be in breach of typical end-user program licensing agreements. Thus, there is a need for a load module scanner which offers flexibility without excessive programming or computational requirements.

SUMMARY OF THE INVENTION

Accordingly, the present invention provides a method of recognising command related items in a body of object code, said command related items corresponding to command names and/or associated option names from a textual programming language; the method comprising: entering a list of entries each comprising a required command name and/or option names in programming language textual form into a filter table; scanning the body of object code for all bit strings potentially representing command names and identifying such command names; for each potential command name so identified, examining a number of succeeding bits for bits which represent valid options for each said command name to further identify commands having valid combinations of command names and options; and for said identified commands, comparing said identified command names and/or option names in programming language textual form with the entries of said filter table to determine whether or not they match any of the list of required command names and/or options in said filter table.

According to other aspects, the invention also provides a system and a computer program for recognising command related items in a body of object code, analogously to the method of the invention.

The invention offers a flexible and straightforward way for a user to check whether or not an application program will run in a given computing environment without the necessity for source code to be available and without the need for laborious programming of object code sequences corresponding to the desired commands and options. Instead, the object code is scanned in two stages firstly for a generic command identifier and secondly for a bit string which can be decoded into command related options. The text form of the commands and options are then identified and compared with predetermined entries in a filter table, also in program language form and which can be simply entered by a user.

Although the example of programming language given is the CICS API, the invention is usable with any programming language. Clearly, it is of more value with high level languages, such as COBOL, PL/1 and C but it may also be used with low level, assembler type languages or more recent object oriented languages, such as C++ or Java ("Java" is a trademark of Sun Microsystems, Inc.).

The term "object code" as used herein is intended to cover not only the compiled, assembled or interpreted code resulting from the source program but also the executable code resulting from the combination of this compilation process with linked library code and job control instructions in a load module.

It is a preferred feature of the invention that a further check for valid syntax is made on the candidate command/option instances before they are accepted for comparison with the filter table entries. Such validation may involve the use of a syntax tree but other methods of syntax checking may be used.

Another preferred feature of the invention is to permit logical operations to be specified for the filter table entries, particularly to allow the presence or absence of a command or option to be checked. This allows commands and options to be filtered out as well as in. An elementary check on the syntax of the filter table entries is also desirable, though, it will be noted that this is not quite the same as checking the complete command and option syntax.

Preferably, the object code bit strings from the load module are compared with bit strings in a library which represent all possible commands names and options for the programming language.

The programming implementation of the invention preferably involves object oriented programming in which the object code scanner code includes verb objects for representing and identifying command names, a parameter decoder object for decoding succeeding bits as potentially valid options on identified commands and a syntax object for validating the syntax of each command comprising an identified command name followed by one or more valid option names.

Preferably, the programmed implementation includes a two dimensional array data structure the rows and columns of which are indexed by each of a pair of supplied bytes respectively and a file parser object for supplying successive pairs of object code bytes to said array. The array contains pointers to respective verb objects for each pair of supplied bytes representing a potentially valid command and the file parser object initiates respective verb objects in response to the return of a pointer from the array.

It is not necessary that the invention be implemented in object oriented programming and it could be programmed in a procedural programming language instead.

BRIEF DESCRIPTION OF THE DRAWINGS

The invention will now be described, by way of example only, with reference to a preferred embodiment thereof as illustrated in the accompanying drawings, in which.

DESCRIPTION OF PREFERRED EMBODIMENT

Figure 1:
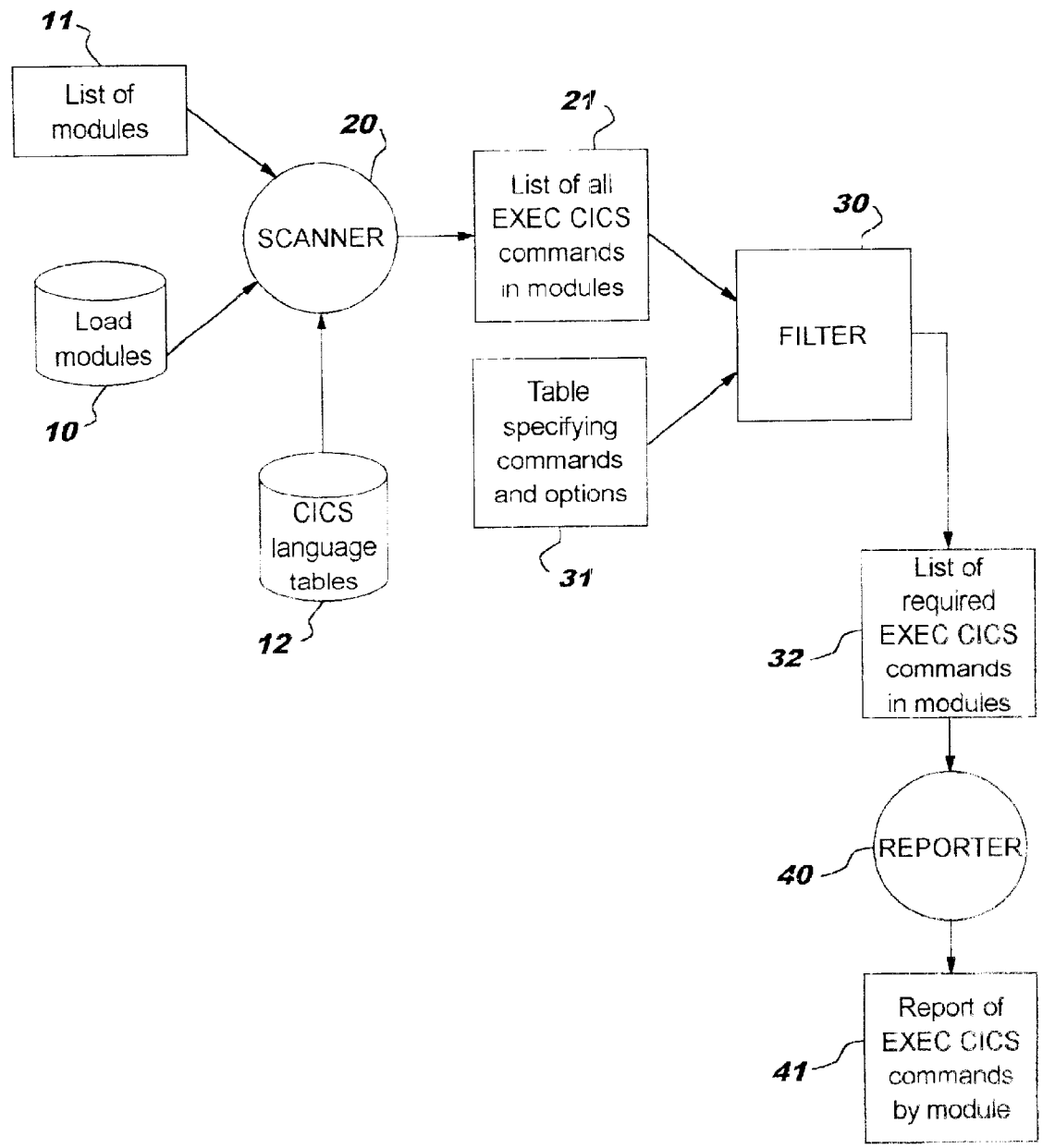
FIG. 1 is a schematic illustration of a system for recognising command related items in object code according to the present invention.

The system of FIG. 1 implements the invention as a load module scanner (LMS) applied to IBM's CICS Transaction Server products. It is therefore appropriate to introduce certain aspects of CICS programming before describing the LMS further.

As stated above, CICS is a middleware product providing transactional support service for customers' transaction processing applications. It controls aspects of database and data communication management involving a large network of terminals, such as recovery of data and resources in the event of a failure of communication. The CICS programs run on many different operating systems of IBM and other suppliers and are available in both multi-region and distributed versions.

Customers can write application programs for their own business transactions scenario in high level programming languages such as COBOL, PL/1 or C, and in lower level Assembler language. Many independent software vendors' program products are also written in these languages. Such application programs or utilities run on top of CICS.

In order to program the many specialised functions provided by CICS more easily, an additional Application Programming Interface (API) is provided which has a number of additional commands known as EXEC CICS commands, relating to those functions. In current versions of the product, these are translated in a preliminary batch process into equivalent source language statements in the language of the remainder of the application. The translated application source code integrated with the other non-CICS specific application source code is then compiled or assembled at run time. In the case of COBOL, for example, EXEC CICS commands are translated into COBOL Call commands to an underlying CICS system program, known as DFHEIP, and a sequence of arguments which will be needed by DFHEIP when it is eventually called and run.

In source form, an EXEC CICS command takes the form:
EXEC CICS function option(arg) option . . .

The functions are actions like READ, SEND etc. and the options are parameters associated with the function which consist of a keyword and, in some cases, an argument (value) in parenthesis after the keyword. For example, the options for the READ command include FILE, RIDFLD, UPDATE and others. FILE is the name of the file to be read and is always followed by a value indicating or pointing to the file name. RIDFLD is a record identification field or key and also needs a value whereas UPDATE simply indicates a change to the record and doesn't need a value. So to read, with intent to modify, a record from a file known to CICS as ACCTFIL, using a key stored in working storage as ACCTC, the command would be:
EXEC CICS READ FILE ('ACCTFIL') RIDFLD(ACCTC) UPDATE . . .

When an EXEC CICS command is translated and compiled, it results in an encoded argument list to be used with the Call DFHEIP statement. The first argument in this list is a constant known as "argument zero". The first two bytes of this constant are a Group byte and a Function byte which together identify the CICS command followed by further bytes which identify the options.

The LMS system of FIG. 1 is a batch utility for scanning load modules 10, containing the object code of a CICS application or other utility program, for the presence or absence of specified EXEC CICS commands and options (parameters). The actual load modules to be scanned may be specified by means of a list 11. The principal components of the system are a scanner 20 and a filter 30.

The scanner is provided with a library of CICS language tables 12 correlating all possible CICS commands and options specified in source code form with their compiled equivalents in object code, which are argument zero byte strings. Initially, as will be explained further below, the scanner 20 iteratively scans through the bytes of object code in the selected load modules for CICS command name matches and then performs further validity checks on the succeeding bits to confirm that the object code string meets other criteria of a CICS command, which results in the options on the commands also being identified. The scanner then outputs a list 21 of all EXEC CICS commands which have been identified, including their options.

This list is then applied to the filter 30. A second input to the filter 30 is a user specified table 31 of commands and/or options, in program language textual form, which may also include logical operators on those options. This is used to specify the command and option combinations which the user requires to be identified. After validation of the table entries, the filter logically filters the list 21 to produce a final list 32 of those commands meeting the logical criteria, located in the scanned modules. In practice, these are the commands which will not run on the user's particular CICS system.

A reporter 40 generates an appropriate summary or detailed report 41 which identifies these located commands and the module in which they occur. The location of the command in the module may also be given.

Figure 2:
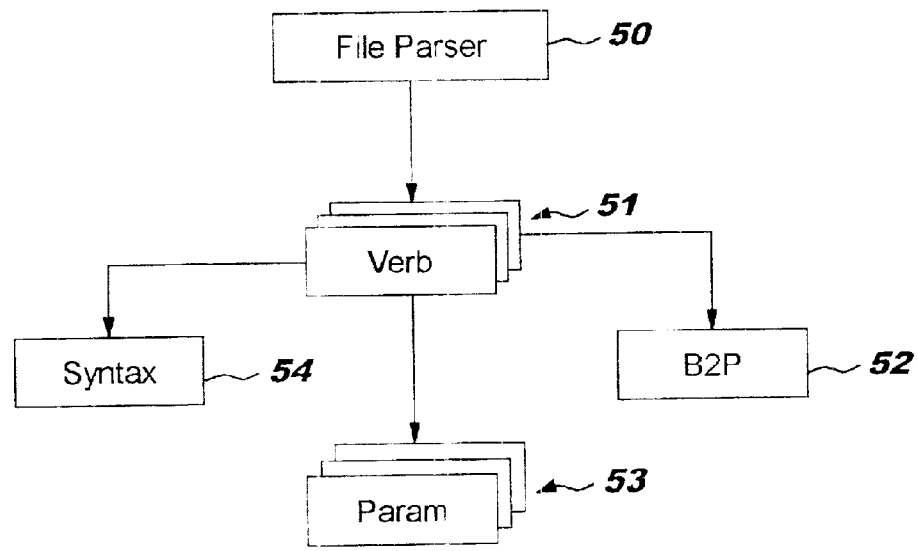
FIG. 2 shows objects and their relationships used in one programming implementation of a scanner employed in FIG. 1.
Figure 3:
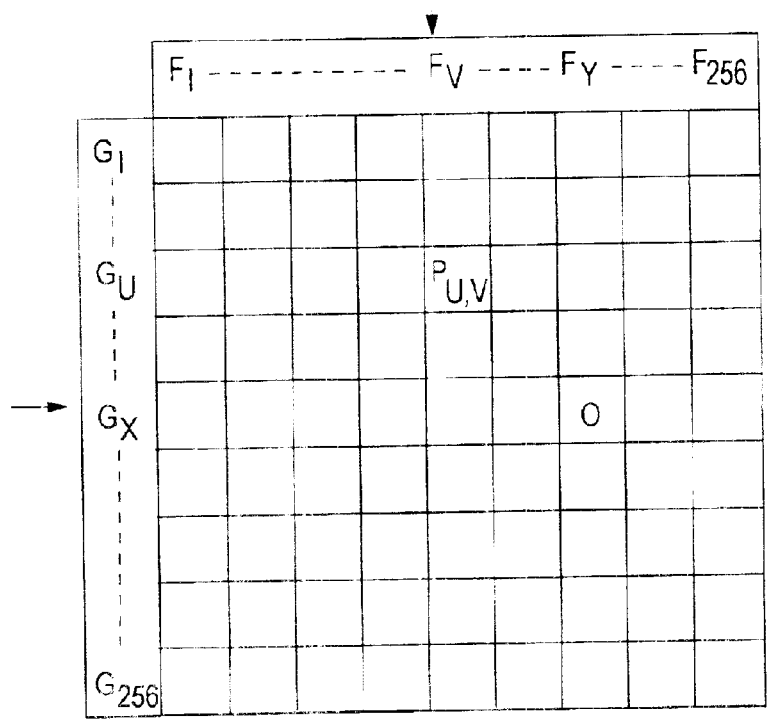
FIG. 3 is a two dimensional array table used by the scanner of FIG. 1.
Figure 4:
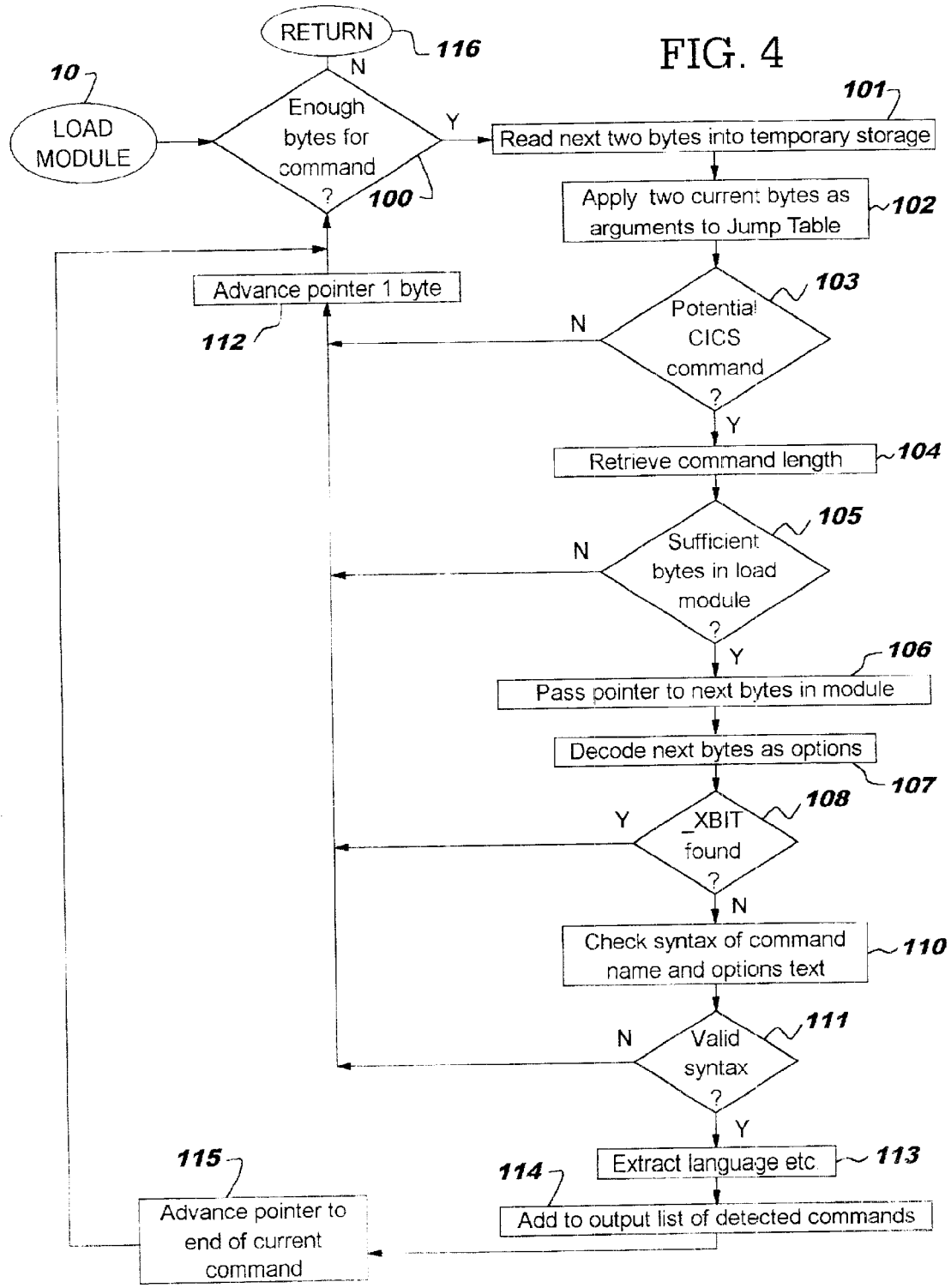
FIG. 4 is a flow diagram illustrating the method of operation of the system of FIG. 1.

A more detailed explanation of the operation of the scanner now follows with reference to FIGS. 2 and 3 and the flow diagram of FIG. 4. To follow this, it is necessary to explain further about the structure of the CICS language tables 12 and the set of objects created from them by the LMS.

Referring to FIG. 2, the language tables are derived from stored arrays which constitute the data for a File Parser object 50. When the LMS enters a startup phase, these arrays are passed to a File Parser constructor object to create the File Parser object 50. The File Parser object then works through lists stored in the arrays and instantiates various sub objects including Verb sub-objects 51, each of which can resolve the first two argument zero bytes into a respective CICS command, and global parameter objects, which are all the options available on commands. Each Verb objects then initiates further sub objects, each of which is created when appropriate data is passed to the constructor function of the new object.

One of these is a B2P (Bit to Parameter) sub object 52, whose function is to decode the succeeding bits of argument zero after the first two bytes, which represent the possible options on the commands, into textual form. The B2P object is one of three types according to which type of coding has been used (Original, Fixed or Variable as discussed below).

There are three possible encoding schemes for the options, two of which are of fixed length:
ORIGINAL: coding is bit positional. Most bits map to a single option (parameter) but some may be coded in pairs. The length is specified by a declaration in CICS Language Tables (12 in FIG. 1). The single bit coding may be used to represent two mutually exclusive parameters, according to whether it is set on or off.

Additionally, in the original coding scheme, not all bits carry parameter coding and these are supposed to be set to a default value (zero). If the B2P decoder detects a different value, it adds a fake parameter '_XBIT' (meaning exception bit) to the output parameter list which effectively marks the command as invalid.

FIXED: coding is byte positional. Each byte's value represents which option(parameter) was coded. The length is specified by the declaration in the Language Tables.

VARIABLE: coding is again byte positional and each byte's value represents which option(parameter) was coded. However, the length is not fixed so the relevant bytes are terminated by a null (zero) byte. As options (parameters) cannot be coded more than once in Argument Zero, there is a theoretical limit of 255 bytes, as there are only 255 possible options (parameters).

The second type of sub object initiated by the Verb object is a group of Param objects 53 each of which contains the respective options for each Verb. The Param objects also contain a flag which distinguishes real from aliased parameters which cannot be detected by the scanner.

The third type of sub object is a Syntax object 54 for creating a syntax tree to check the validity of potential commands identified by the earlier phases of the scan.

Also created at this time is a Jump Table, as shown in FIG. 3. This is the heart of the initial identification routine and consists of a 256 by 256 array of pointers to Verb objects. The array is indexed by supplying two successive bytes to the Group code row, G, and the Function code column, F. If the pair of supplied bytes (for example, $G_u$, $F_v$) represent a potential CICS command, then the table entry is a pointer ($P_{u,v}$) to a Verb object. If not (for example, $G_x$, $F_y$) null value (0) is found.

The operation of the scanner will now be described with reference to the flow diagram of FIG. 4. Bytes are iteratively extracted from a load module 10 (as FIG. 1) such that, if enough bytes exist in the module to represent a command, as determined by step 100, two bytes are read into temporary storage in step 101. The two bytes are applied, in step 102, to the Jump Table of FIG. 3. The output of the Jump Table indicates, in step 103, whether the two bytes are potentially an EXEC CICS command and, if they are, points to the corresponding Verb object 51. If they are not, a load module pointer is advanced by one byte, in step 112, and further bytes are read, if available.

Assuming a potentially valid command, however, the length of the command is retrieved, in step 104, and if a sufficient number of bytes remains to be processed within the load module, as determined in step 105, the load module pointer is passed to the Verb object, in step 106. The load module pointer represents the current position of the scan in the load module and the B2P object 52 decodes the succeeding bits or bytes in step 107. The decoder output is next tested for the presence of the _XBIT parameter in step 108 which may occur if the B2P object is decoding bit coded parameters according to the original coding scheme. If _XBIT is found, the bit string being scanned is again not an EXEC CICS command, and steps 112 and 100 are repeated to read more bytes from the load module.

The decoded options (parameters) they are added to the potential command name, all now in textual form, and the entire command is applied to a syntax checker in step 110. The syntax checker employs a syntax tree method but the particular method is not important to an understanding of the invention. If the syntax is pronounced valid, in step 111, then a step 113 of extracting program language information and other helpful diagnostic information is carried out and the text version of the full command is added to an output list (21, FIG. 1) in step 114. The load module pointer is then advanced, in step 115, to the known end of the validated current command. If the syntax had not been valid, the pointer would have been advanced by a single byte in step 112.

When there are no more bytes to read, the scan is complete, and the scanner routine returns control to the calling program at step 116.

The result of the scan is that all possible bit strings in the load module having the form of valid EXEC CICS commands are identified and placed in text form in the output list 21 for further analysis by filter 30. As described above, these commands are compared with a predetermined set of commands and of logical combinations of commands and options entered into the filter table 31. An example of the various forms of logical combination possible is shown in the following table. There are two operators, an asterisk (*), meaning "any parameter" and a minus sign (−) meaning the following parameter should not be present. The command chosen to illustrate the operation of the filter table is WRITEQ TS, which is a command to write data to a queue in temporary storage. Each variant of the command type is placed on a separate line of the table and followed by parameters and operators.

| COMMAND | PARAMETER SPECIFICATION |
|---|---|
| WRITEQ TS − NUMITEMS SYSID * | All WRITEQ TS commands, without NUMITEMS but with SYSID |
| WRITEQ TS − NUMITEMS * | All WRITEQ TS commands, without NUMITEMS |
| WRITEQ TS * | All WRITEQ TS commands, any parameters |
| WRITEQ TS QUEUE FROM LENGTH | All WRITEQ TS commands only with QUEUE & FROM & LENGTH |
| * LENGTH * | All commands with a LENGTH parameter |
| * * | All commands with any parameters |

The second asterisk in the * LENGTH * entry represents that all commands with the LENGTH parameter are required. The absence of the second asterisk would mean that only commands with a LENGTH parameter but no other were required. It will be recognised that these are just examples of filter table inputs and that they do not represent a particular set of desired commands.

Before entries are accepted into the filter table 31, a simple validity check is made to ensure that each logical combination does represent a set of valid commands. This is not the same check as the syntax validity check of step 107, as, clearly, the filter table 31 entries need not specify complete commands.

The actual logical operations are carried out by the filter 30 which provides the final list 32 of EXEC CICS commands present in the load module. Typically, these are selected to be a subset of commands which are not supported by a particular version of CICS.

The final list is passed to the reporter 40 which produces summary or detailed reports on the occurrences of the subset commands. A summary report contains:

A line for each module in the library containing the module name, the number of required commands located and the identified language of each module;

The total count of modules in the library, modules scanned, CICS modules and tables (not scanned) and modules that could contain some specified commands.

The detailed report gives all the above and also:

a header part for each module, giving its name and language;

a line for each specified command located, giving the offset of the commands Argument Zero declaration from the start of the load module and the line number in the code at which the command was located;

what the command appears to be, including its parameters.

An example of a detailed report from the load module scanner is as follows:

| CICS LOAD MODULE SCANNER UTILITY SCAN PERFORMED ON Tues June 6, 08:47:51 2000 USING TABLE RSTABLE1.1 | |
|---|---|
| DETAILED LISTING OF UTL.CL717.LOAD | |
| Offset/EDF | Command |
| Module Name | DFHLMS00 |
| Module Language | Assembler |
| 00000648/no-edf | ISSUE ERROR STATE CONVID |
| 00000668/no-edf | LOAD PROGRAM |
| 00000677/no-edf | LOAD PROGRAM HOLD |
| 00000686/no-edf | LOAD PROGRAM LENGTH |
| 00000695/no-edf | LOAD PROGRAM FLENGTH |
| 00000704/no-edf | LOAD PROGRAM LENGTH HOLD |
| 00000713/no-edf | LOAD PROGRAM FLENGTH HOLD |
| 00000722/no-edf | WRITEQ TS FROM LENGTH QUEUE AUXILIARY NUMITEMS |
| 00000731/no-edf | WRITEQ TS FROM LENGTH QUEUE |

-continued

| CICS LOAD MODULE SCANNER UTILITY SCAN PERFORMED ON Tues June 6, 08:47:51 2000 USING TABLE RSTABLE1.1 |  |
| --- | --- |
| DETAILED LISTING OF UTL.CL717.LOAD | |
| Offset/EDF | Command |
| | AUXILIARY |
| 00000740/no-edf | WRITEQ TS FROM LENGTH QUEUE MAIN |
| 00000749/no-edf | SEND TEXT FROM LENGTH TERMINAL |
| 00000764/no-edf | SEND TEXT FROM LENGTH L40 TERMINAL |
| 00000779/no-edf | SEND TEXT FROM LENGTH L64 TERMINAL |
| 00000794/no-edf | SEND TEXT FROM LENGTH L80 TERMINAL |
| 00000809/no-edf | RETURN |
| Module Name | INTROC |
| Module Language | Cobol II |
| 00000174/00085 | ADDRESS COMMAREA |
| 00000204/00164 | LINK PROGRAM COMMAREA LENGTH |
| 00000221/00132 | RETURN |
| 00000238/00127 | RETURN |
| 00000255/00112 | RETURN |
| 00000272/00106 | RETURN |
| 00000289/00100 | RETURN |
| 00000306/00080 | RETURN |

Total possible commands located=23.

| LOAD LIBRARY STATISTICS | |
| --- | --- |
| Total modules in library = | 2 |
| Total modules Scanned = | 2 |
| Total CICS modules/tables not scanned = | 0 |
| Total modules possibly containing requested commands = | 2 |

The reference to "edf" is to the CICS Execution Diagnostic Facility, which can, if present, produce additional information about the location of the command in the source program.

Thus, the described scanner mechanism allows great flexibility in the definition of subsets of commands and parameters to be detected and ease of entry of the subset definitions in ordinary program textual language with no need for any special programming.

What is claimed is:

1. A method of recognizing command related items in a body of object code, said command related items corresponding to command names and/or associated option names from a textual programming language, said method comprising the steps of:

entering a list of entries, each comprising a required command name and/or option names in programming language textual form, into a filter table;

scanning the body of object code for all bit strings potentially representing command names and identifying such command names;

for each of the potential command names so identified, examining a number of succeeding bits for bits which represent valid options for each said potential command name to further identify commands having valid combinations of command names and options; and for said identified commands, comparing said identified command names and/or option names in programming language textual form with the entries of said filter table to determine whether or not they match any of the list of required command names and/or options in said filter table.

2. A method as claimed in claim 1, further comprising the step of, after said scanning and examining steps, validating syntax of each command comprising a command name followed by one or more valid option names and comparing only validated command names and/or option names with the entries in the filter table.

3. A method as claimed in claim 2, wherein said validating step further comprises applying each said command to a syntax tree.

4. A method as claimed in claim 1, wherein said filter table entries can specify both a presence and an absence of respective command names and/or option names in the scanned and examined object code.

5. A method as claimed in claim 1, wherein at least some of said filter table entries include combinations of command and/or option names, said method further comprising the step of checking syntax of said combination entries to the filter table.

6. A method as claimed in claim 1, wherein said scanning and examining steps involve comparing object code bit strings with bit strings extracted from a library which represent all possible command names and options for said programming language.

7. An object code recognition system for recognizing command related items in a body of object code, said command related items corresponding to command names and/or associated option names from a textual programming language, said system comprising:

a filter table for holding a list of entries, each comprising a required command name and/or option names in programming language form;

an object code scanner for scanning the body of object code for all bit strings potentially representing command names and identifying such command names, said scanner being arranged, in response to identification of each potential command name, to examine a number of succeeding bits for bits which represent valid options for each said command name to further identify commands having valid combinations of command names and options; and a filter for comparing said identified command names and/or option names in programming language textual form with the entries of said filter table to determine whether or not they match any of the list of required command names and/or options in said filter table.

8. A system as claimed in claim 7, further comprising a syntax checker for validating the syntax of each command, comprising a command name followed by one or more valid option names whereby only validated command names and/or option names are compared with the entries in the filter table by said filter.

9. A system as claimed in claim 8, wherein said syntax checker includes a syntax tree.

10. A system as claimed in claim 7, wherein said filter table entries can each specify both a presence and an absence of respective command names and/or option names in the scanned and examined object code, and said filter is responsive to said specification in determining whether or not said identified command names and/or option names match said filter table entries.

11. A system as claimed in claim 7, wherein at least some of said filter table entries include combinations of command and/or option names, said system further comprising means for checking the syntax of said combination entries to the filter table.

12. A system as claimed in claim 7, further comprising a library containing bit strings representing all possible command names and options for said programming language.

13. A system as claimed in claim 7, wherein said filter is arranged to generate a list of matching commands.

14. A computer program recorded on a medium and executable on a computer to recognise command related items in a body of object code, said command related items corresponding to command names and/or associated option names from a textual programming language, said program comprising:

a filter table data structure for holding a list of entries each comprising a required command name and/or option names in programming language form;

object code scanner code for scanning the body of object code for all bit strings potentially representing command names and identifying such command names, said scanner code being arranged, in response to identification of each potential command name, to examine a number of succeeding bits for bits which represent valid options for each said command name to further identify commands having valid combinations of command names and options; and filter code for comparing said identified command names and/or option names in programming language textual form with the entries of said filter table to determine whether or not they match any of the list of required command names and/or options in said filter table.

15. A computer program as claimed in claim 14, wherein said object code scanner code includes verb objects for representing and identifying command names;

a parameter decoder object for decoding succeeding bits as potentially valid options on identified commands; and a syntax object for validating the syntax of each command comprising an identified command name followed by one or more valid option names.

16. A computer program as claimed in claim 15, further comprising a two dimensional array data structure, rows and columns of which are indexed by each of a pair of supplied bytes in said object code respectively, and a file parser object for supplying successive pairs of object code bytes to said array, the array comprising pointers to respective verb objects for each pair of supplied bytes representing a potentially valid command, the file parser object initiating respective verb objects in response to the return of a pointer from said array.

\* \* \* \* \*